US006693722B1

(12) United States Patent
Mixer, Jr.

(10) Patent No.: US 6,693,722 B1
(45) Date of Patent: Feb. 17, 2004

(54) PRINTER CONFIGURATION UPDATE SYSTEM AND METHOD

(75) Inventor: J. Bruce Mixer, Jr., Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,384

(22) Filed: Apr. 13, 2000

(51) Int. Cl.[7] .............................................. G06K 15/00

(52) U.S. Cl. ..................................... 358/1.15; 358/1.13

(58) Field of Search ......................... 358/1.1, 1.5, 1.13, 358/1.15, 406; 710/8, 10, 15, 16, 19; 709/310, 327

(56) References Cited

U.S. PATENT DOCUMENTS 5,537,626 A 7/1996 Kraslavsky et al. ........ 395/828
2003/0090704 A1 * 5/2003 Hansen ...................... 358/1.15

* cited by examiner

*Primary Examiner*—Arthur G. Evans
(74) *Attorney, Agent, or Firm*—Kunzler & Associates

(57) ABSTRACT

A printer configuration update system and method provide automatic updates of a printer configuration to a communicating device which may be a network interface card and/or a protocol converter. A configuration listing with a predetermined format is transmitted to the communicating device at the time of power-up of the printer and after any configuration changes. The configuration listing may be passed as a variable-length structure consisting of ordered fields containing codes recognizable by the communicating device. The new configuration may be a new printer coming on-line or may be a modification to an existing printer occurring during operation of the printer. Newly developed printers may thus be connected to the communicating device without having to reprogram the new printer configuration into the printer or the communicating device, and current printer configuration data may be transmitted to a protocol converter during operation for accurate data stream conversion.

24 Claims, 7 Drawing Sheets

PRINTER CONFIGURATION UPDATE SYSTEM AND METHOD

BACKGROUND OF THE INVENTION

1. The Field of the Invention

The present invention relates to systems and methods for providing an updated printer configuration to an external device. More specifically, the present invention relates to systems and methods that automatically provide printer configuration updates to an external communications device during initialization of a printer and during operation of the printer.

2. The Relevant Art

As computer systems increase in complexity and functionality, increased demands are being placed on the printers and printing systems that service those computer systems. Printers are thus, out of necessity, becoming more sophisticated. Compatibility of the printers with the various types of devices that may need to communicate with the printers and compatibility with the various mediums over which the printers communicate with the devices are similarly a pressing issues in printer development.

For instance, a printer may be required to communicate not only with a large number of computers over a network or other communications medium, but also with many different types of computers. Computer networks in large organizations may, for instance, include mainframe server computers, work station computers, and PC computers. These computers may be of differing origins and may operate with different protocols. In the past, printers interfaced with these computers through a dedicated print server computer. The dedicated print server computer handled the formatting of data streams for the printer and presented the data stream to the printer in a form compatible with the printer.

More recently, these dedicated print server computers have been replaced in some instances with network interface cards. The network interface cards handle the tasks of communications over the network for the printer and may also conduct data stream formatting for the computer. In some cases, the network interface cards must convert the data stream from a protocol native to the computer to a protocol compatible with the printer. For instance, IBM's OS/390-based mainframe has in the past used a "coax" interface prior to the advent of Ethernet and token ring network conventions. These computers are programmed to communicate with a printer using an SCS protocol, while many modern printers are programmed to understand only a PCL protocol. In order for such computers to communicate with such printers while possibly also allowing other computers programmed to use other standards and protocols to communicate with the printers, protocol conversion is used. In the given instance, the protocol converters convert the SCS data stream from the OS/390 machine to the PCL protocol. Other types of data stream protocol conversion also occur.

In order for the protocol conversion to be fully successful, an up-to-date knowledge of the configuration of the printer is necessary. Thus, the computer or interface device conducting the protocol conversion needs to have access to a configuration listing for the printer. This configuration listing is generally transmitted from the printer to the interface device at power-up of the printer. The interface device stores this configuration listing and uses it in the protocol conversion and for other formatting of data streams to be passed to the printer. Providing the configuration listing has proven burdensome in many cases, particularly in the development of new printers. For each new printer that is developed, a new configuration listing must be generated and coded, and the code in both the printer and the interface device that accesses the configuration listing must also be reprogrammed to accept the new listing. Such programming is time-consuming and accordingly, quite expensive.

In addition, certain aspects of the printer itself may change during operation. For instance, input and output trays may be swapped, added, or removed. The type of paper in a tray or that a tray can handle may change. Other similar changes may be conducted during operation and after power-up and initialization of the configuration listing. Interface devices lacking this current configuration information may cause an undesired result at the printer, including printing on the wrong type of paper, to the wrong tray, or simply an error condition.

From the above discussion, it is apparent that an improved printer communication system is needed that reduces the burden of reprogramming the configuration of a new printer into the system. Additionally, an improved printer communication system is needed that is capable of providing printer configuration updates to a communicating device during operation of the printer.

OBJECT AND BRIEF SUMMARY OF THE INVENTION

The printer configuration system and method of the present invention have been developed in response to the present state of the art, and in particular, in response to the problems and needs in the art that have not yet been fully solved by currently available printer systems. Accordingly, it is an overall object of the present invention to provide a printer configuration update system and method that overcome many or all of the above-discussed shortcomings in the art.

To achieve the foregoing object, and in accordance with the invention as embodied and broadly described herein in the preferred embodiment, a printer configuration update system for automatically providing an updated printer configuration between a printer and a communicating device is provided. In disclosed embodiments, the system comprises a configuration detector module configured to receive notification of a new printer configuration; a configuration manager configured to update a configuration listing of the new printer configuration; and a communication module configured to provide notification of the new configuration to a communicating device that is configured to transact external communications for the printer. The communicating device may be a network card and/or a protocol converter.

The printer configuration update system may also comprise a configuration update module residing on the communicating device. The configuration update module may be configured to interpret the configuration listing. In addition, a shared memory residing on a controller of the printer may be provided for use in passing the configuration listing to the communicating device. A handshaking register may be resident on the communicating device, and may be configured for use in effecting communications between the printer and the communicating device.

The printer configuration update system may also comprise a communications channel between the printer and the communicating device. Preferably, the communications channel operates under the PCI interface protocol. The communicating device may be a network interface card comprising a protocol converter. The configuration listing may comprise a dynamic configuration structure with a variable length.

A method of automatically providing an updated printer configuration between a printer and a communicating device is also provided as part of the present invention and may be used in conjunction with the printer configuration update system of the present invention. In one embodiment, the method comprises detecting internally within a printer a new printer configuration; recording the new printer configuration; and notifying a communicating device that is configured to transact external communications for the printer of the new printer configuration.

The step of detecting a new printer configuration may comprise detecting a new printer attached to the communicating device. Alternatively, the step of detecting a new printer configuration may comprise detecting a modification of a configuration of a printer already connected to the communicating device. Of course, both types of detection may in occur during the life of a printer in selected embodiments.

In one embodiment, the communicating device comprises an interface card for conducting network communications for the printer. The communicating device may also comprise a protocol converter for converting one data stream (printer language) to another data stream having a protocol which is compatible with the printer. Thus, the method may comprise, for instance, converting a SCS data stream into a PCL data stream by the protocol converter.

The new printer configuration may comprise a modification of a printer tray, and recording the change in configuration may comprise updating a configuration listing. Preferably, the configuration listing is a variable-length, dynamic structure and may comprise both static-length and dynamic-length counterparts.

Thus, the method may comprise providing both the static-length and dynamic-length counterparts during an initialization of the printer, and may also comprise subsequently updating one or both of the static-length and dynamic-length counterparts during operation of the printer in response to a new printer configuration occurring during the operation of the printer.

The method may comprise providing the configuration listing in a data stream of at least three components. A first component identifies the configuration listing. A second component specifies the length of the configuration listing, and a third component contains the configuration data. The configuration data may comprise fields listed in a predetermined order. Each field may contain a parameter of the printer configuration according to a selected protocol. The method may also comprise the communicating device accessing the configuration listing by a direct memory access to a shared memory resident on the printer.

Attaching a new printer to the communicating device may comprise providing a new model of printer with a new configuration. The new printer may be attached to the communicating device without programming code individual to the new model of printer. That is, under the present invention, new code in the printer or communicating device need not be programmed to communicate the new printer's configuration to the communicating device.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
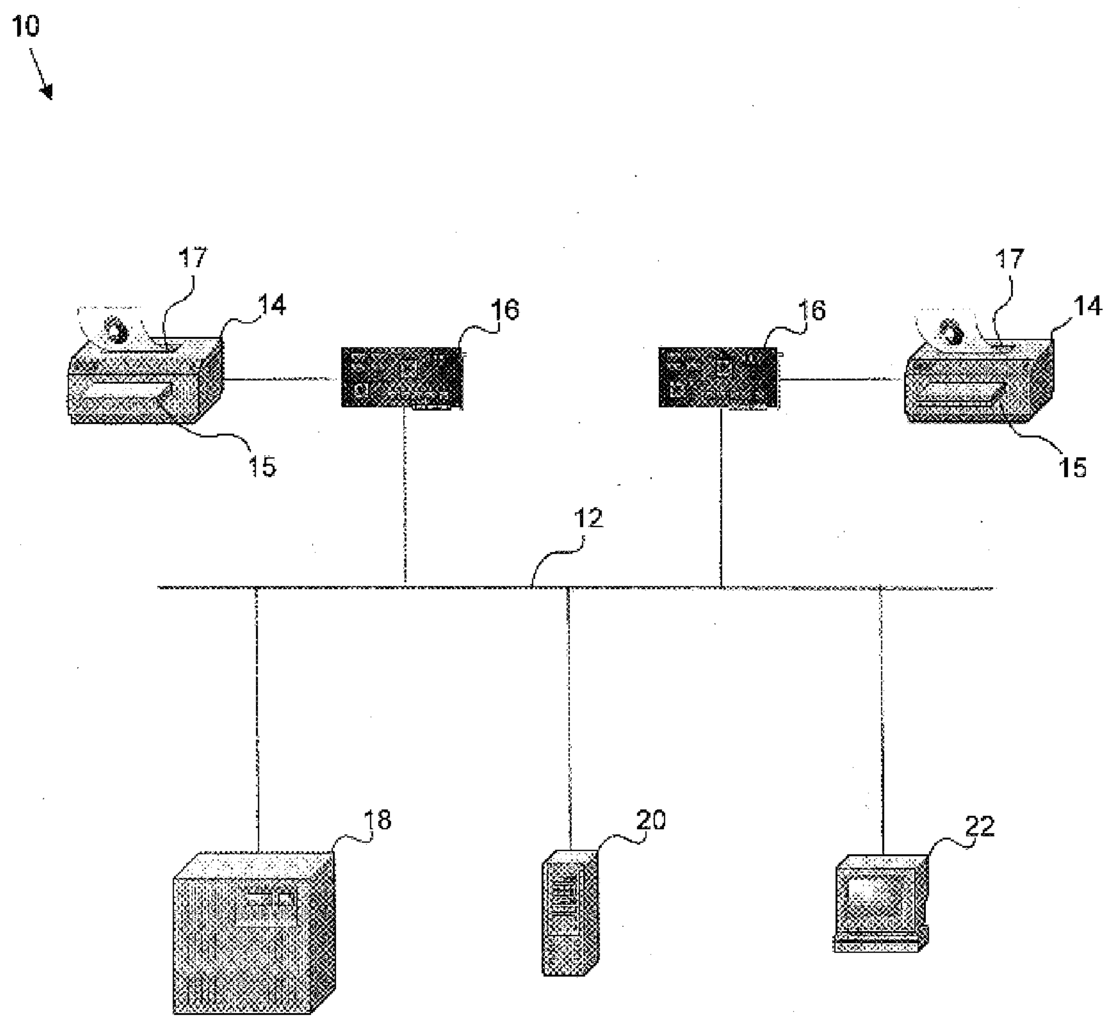
FIG. 1 is a schematic block diagram illustrating one embodiment of a computer system suitable for incorporating the printer update system and method of the present invention.

Referring initially to FIG. 1, shown therein is a computer system 10 suitable for incorporating the printer configuration update system and method of the present invention. The computer system 10 of FIG. 1 operates on a network 12. The network 12 may be any suitable network, and may operate under any suitable protocols, including IPX, TCP/IP, Ethernet, and token ring.

Shown connected to the network 12 are two printers 14 The printers 14 are each provided with at least one input bin or tray 15 and at least one output bin or tray 17. In the depicted embodiment, each of the printers 14 communicates with other devices on the network 12 through communicating devices that in the depicted embodiment comprise network interface cards 16. Of course, other types of communicating device such as server computers or the like could also be used.

In one embodiment, the interface cards 16 are also protocol converters. That is, the interface cards 16 are configured to convert data streams received from other devices on the network 12 into a protocol compatible with the printers 14. For instance, an IBM OS/390 mainframe server 18 may be connected to the network 12 and may be required to print to one of the printers 14. The OS 390 mainframe may transmit data streams for printing in a protocol such as IBM's Systems Network Architecture Character Stream (SCS) which is not understood by one or both of the printers 14. Accordingly, the interface cards 16 may be configured with code to convert the SCS protocol to a protocol compatible with the printers, such as Printer Command Language (PCL). A specific example where the communicating device comprises a interface card 16 is given herein, but it should be understood that in each instance where the term "interface card" is used, other types of communicating devices could also be substituted therefor.

Other devices, such as a workstation 20, personal computer (PC) 22, or the like, may communicate through other protocols, including protocols compatible with the printers 14 and protocols that are not compatible with the printers 14. The interface cards 16 may also convert the other protocols to a compatible protocol, or may allow the data stream to pass through to the printer 14 if the data stream is already formatted with a compatible protocol.

Figure 2:
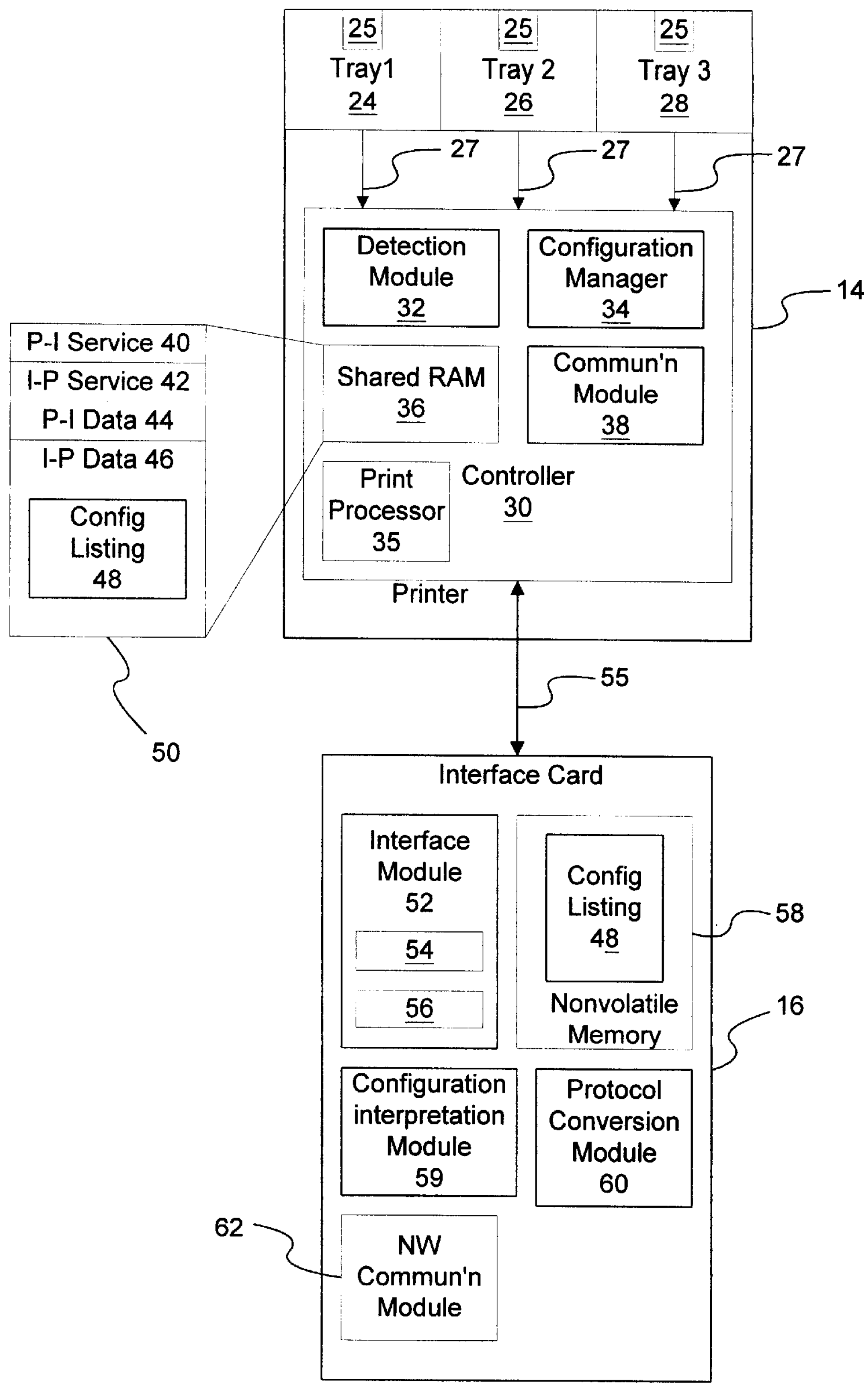
FIG. 2 is a schematic block diagram illustrating one embodiment of a printer update system of the present invention.

Referring now to FIG. 2, shown therein is a printer 14 and an interface card 16 incorporating therein the printer configuration update system of the present invention. The printer 14 is shown configured with a plurality of trays 24 and a controller 30. Within the controller is a detection module 32 that is preferably configured to monitor the trays 24, 26, 28 and detect any alterations in the configuration of the trays 24, 26, 28. Sensors 25 within the trays 24, 26, 28 are connected through communications lines 27 to the detection module 32. Other configuration parameters of the printer 14 may similarly be monitored.

When a configuration changes, such as a tray being removed or replaced with a different tray, the change is sensed by the sensor 25 and monitored by the detection module. The configuration change is then passed to a configuration manager 34.

The configuration manager 34 is preferably configured to receive any configuration changes from the detection module 32 and to write the new configuration into memory. In the depicted embodiment, the memory comprises a shared RAM 36. The shared RAM 36 is accessible to both the controller 30 and to the interface card 16. Within the shared RAM 36 may be one or more channels 50. In the depicted embodiment, the channels 50 comprise a printer to interface card channel 40, an interface card to printer service channel 42, a printer to interface card data channel 44, and an interface card to printer data channel 46. These channels 50 are used for different types communications.

The configuration of the printer 14 is in one embodiment recorded within a configuration listing 48. The configuration listing 48 is shown stored within the interface card to printer data channel 46, but could be recorded and stored in any suitable storage location, including volatile memory and nonvolatile memory. Preferably, the configuration listing 48 contains a listing of one or more configuration parameters. These parameters may comprise-length configuration parameters for which the length of the field in the configuration listing 48 does not change. These may include items such as paper orientation, addresses to which the interface card 16 attaches at, default lines per inch, default characters per inch, line spacing, printer communication information, and the like. The configuration parameters may also include dynamic-length parameters for which the field length does change. These may include attached input and output trays and their structures, their configuration and orientation, the paper sizes and types (i.e., standard, envelopes, etc.), supported code pages, PCL identifier of a particular tray, PCM forms control, SCF request value for a tray, and the like.

A communication module 38 handles communications for the printer 14. In one embodiment, the communication module receives a formatted data stream from the interface card 16 and passes the data stream to a print processor, which accomplishes the print job. The communication module 38 preferably also notifies the interface card when the printer configuration has changed and may receive permission to update the configuration listing 48.

In the depicted embodiment, the interface card 16 is configured with an interface module 52 which handles communications with the printer 14. In one embodiment, the interface module 52 comprises a pair of registers, a door bell register 54 and a mailbox register 56. Handshaking for communications with the printer 14 is conducted through the registers 54, 56. For instance, notification of a new configuration may be passed from the communication module 38 to the registers and permission to transmit an updated configuration listing 48 may also be passed to the communication module through the use of the registers.

Communications between the printer 14 and interface card 16 are conducted through a communications channel 55. In one embodiment, the communications channel 55 comprises a PCI interface. Communication of information within the shared JRAM 36 may be passed through this interface using direct memory access of the shared RAM 36.

A copy of the configuration listing 48 may be stored within nonvolatile memory 58 of the interface card 16. A configuration interpretation module 59 is preferably provided and is configured to interpret the configuration listing. Thus, the configuration interpretation module 59 is preferably provided with a protocol for anticipating the order of fields of the transmitted configuration parameters and for understanding codes with which the configuration parameters are specified within the ordered fields. In one embodiment, each of the ordered fields comprises a predetermined number of bytes, and the codes comprise hexadecimal numbers.

A protocol conversion module 60 may be included within the interface card 16 for conducting protocol conversions as described above. A network communications module 62 may also be provided for handling communications with devices over the network 12.

Figure 3:
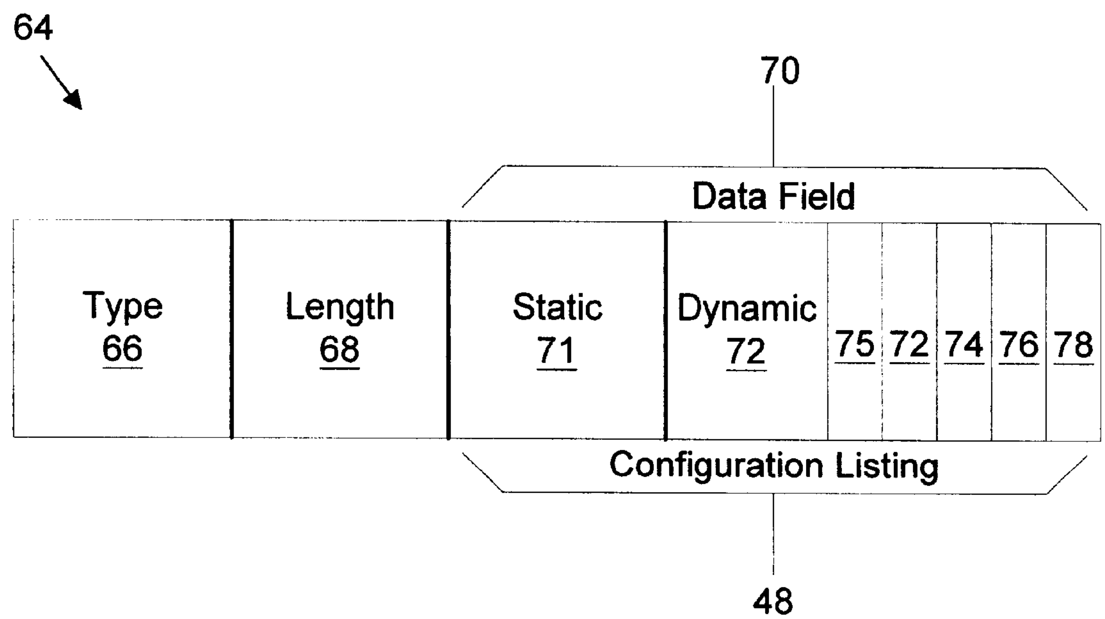
FIG. 3 is a schematic block diagram of illustrating one embodiment of a data stream of the present invention containing a printer configuration listing.

FIG. 3 illustrates one embodiment of a data stream 64 containing a configuration listing 48. The data stream 64 includes a first field 66 which indicates the type of data in the data stream 70. A second field 68 indicates the length of the data stream 64. A third field 70 contains the data. In the depicted embodiment, the data field contains a configuration listing 48.

Within the configuration listing 48 may be both static-length configuration data 71 and dynamic-length configuration data 72 as discussed above. The length of the static-length portion 71 preferably does not change, while the length of the dynamic-length portion preferably does change. Within the dynamic configuration data field 72 may be data specific to a number of input and output trays 24, 26, 28. For instance, a data field 74 may represent the type, structure, and configuration of a first input tray 24. A data field 76 may represent the type, structure, and configuration of a second input tray 26. A data field 78 may represent the type, structure, and configuration of an output tray 28. Other dynamic configuration data may similarly be listed within the dynamic configuration data field 72.

In one embodiment, the configuration listing 48 is in table form. Preferably, the configuration listing is a dynamic, variable-length structure. That is, at least the length of the dynamic-length configuration data 72 is variable. As an example, new models of printers may be provided with different numbers of input and output trays 24, 26, 28. For lesser numbers of trays, the dynamic data 72 is shorter, for instance, the portion 76 representing the second input tray 26 might be omitted when the second input tray 26 is not present within the printer 14. When additional trays are incorporated, additional fields or groups of fields are added in a predetermined order. A length field 75 is preferably used to represent the length of the dynamic data.

The configuration listing 48 is preferably passed to the interface card 16 every time a new printer and/or new model of printer comes on-line. This preferably occurs during an initialization of the new printer. In addition, the configuration listing 48 may also be updated during operation of the printer. That is, a new configuration may be detected by the controller 30, such as the removal or swapping of a tray 24, 26, 28. This new configuration may then be detected, recorded, and passed to the interface card for use in formatting future data streams to be printed.

Figure 4:
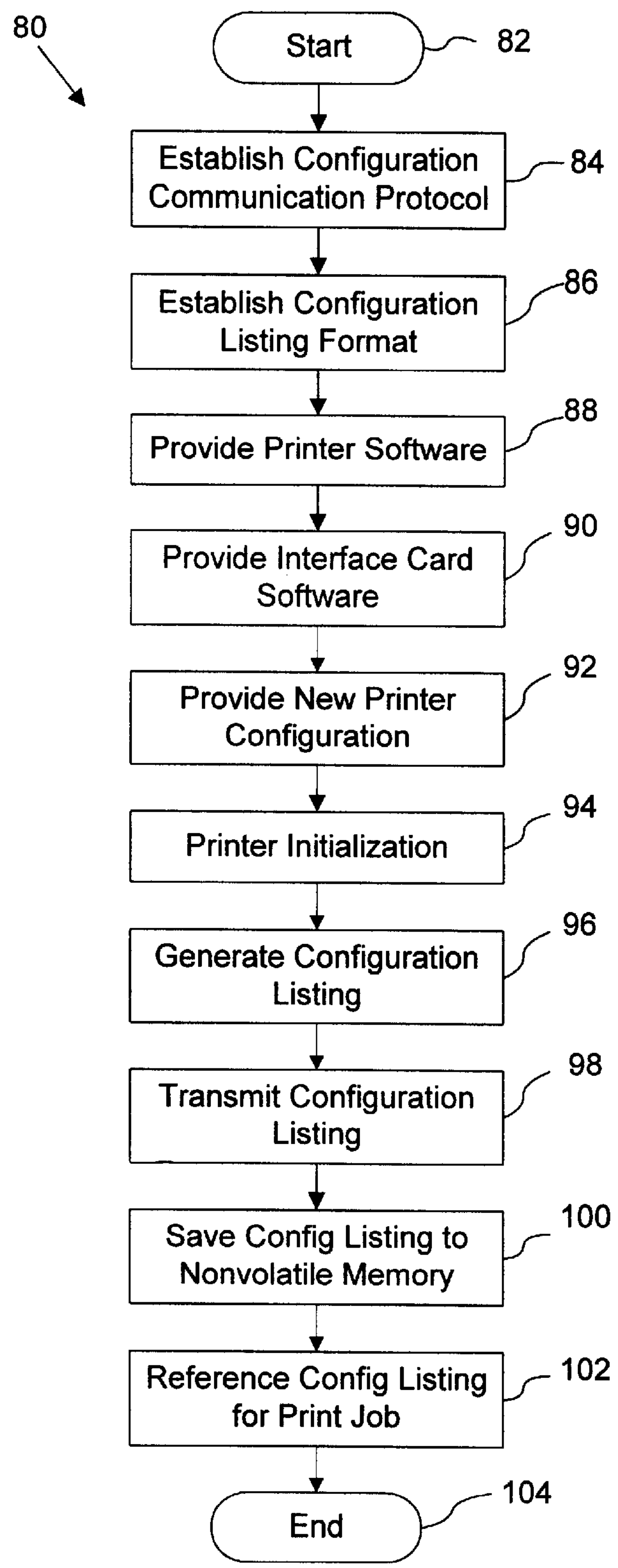
FIG. 4 is a schematic flow chart diagram illustrating one embodiment of a printer update method of the present invention.

One embodiment of a method of updating a printer configuration is shown in the schematic flow chart diagram of FIG. 4. The method 80 starts at a step 82. At a step 84, a configuration communication protocol is established. This protocol may be any suitable protocol, and in one embodiment is the PCI Interface Protocol (PIP) developed by IBM. This protocol preferably governs handshaking and other communication conventions necessary for communication between the printer 14 and the interface card 16.

At a step 86, a configuration listing format is established. This predetermined format provides a basis for generating the configuration listing and for interpreting the configuration listing. In one embodiment, this format comprises a table, and is preferably of variable-length, as described above with respect to the discussion of FIG. 3. Codes are preferably selected for listing the varying configuration parameters and keys to the codes are preferably provided to the configuration interpretation module 59 of FIG. 2.

At a step 88, printer software is provided. In one embodiment, the printer software comprises microcode within a controller such as the controller 30 of FIG. 2. In one embodiment given by way of example, the software is configured as described above with respect to the discussion of FIG. 2.

At a step 90, interface card software is provided. In one embodiment, the interface card software is configured in the manner described above with respect to FIG. 2. For instance, the interface card software preferably provides a configuration interpretation module 59 which has knowledge of the configuration communication protocol of step 84 and the configuration listing format and codes of step 86 in order to be able understand the contents of the configuration listing 48.

At a step 92, a new printer configuration is provided. In one embodiment, this comprises providing a new printer 14 and connecting the new printer 14 to an interface card 16. The new printer may be a newly developed printer for which at least the tray structure and preferably other dynamically configurable parameters have not been separately programmed into the interface card 16.

Figure 6:
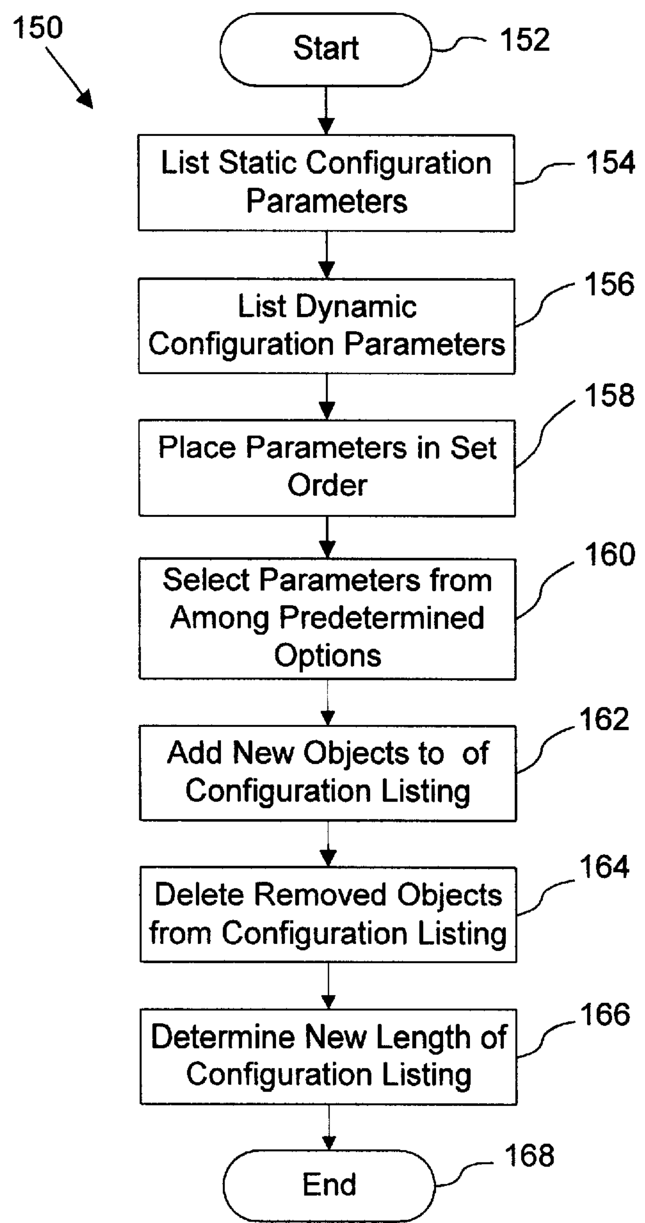
FIG. 6 is a schematic flow chart diagram illustrating one embodiment of a process for accomplishing an update step of the flow chart diagram of FIG. 5.

At a step 94, the printer is initialized. This preferably comprises connecting the printer 14 to the interface card 16 and powering the printer 14 up. At a step 96, a configuration listing is generated. One embodiment of a process 150 for generating a configuration listing is shown in FIG. 6 and will be described in greater detail below. In one embodiment, both static-length and dynamic-length configuration items and parameters are placed in the configuration listing. Thus, the configuration listing 48 may be a variable-length structure as described above.

At a step 98, the configuration listing is transmitted or otherwise passed to the interface card. Once received, the configuration listing is preferably saved to nonvolatile memory (such as the nonvolatile memory 58 of FIG. 2) at a step 100. Thus, the configuration listing may then be referenced, as listed at a step 104, for further print jobs, including for use in protocol conversion. At a step 104, the method 80 ends.

Figure 5:
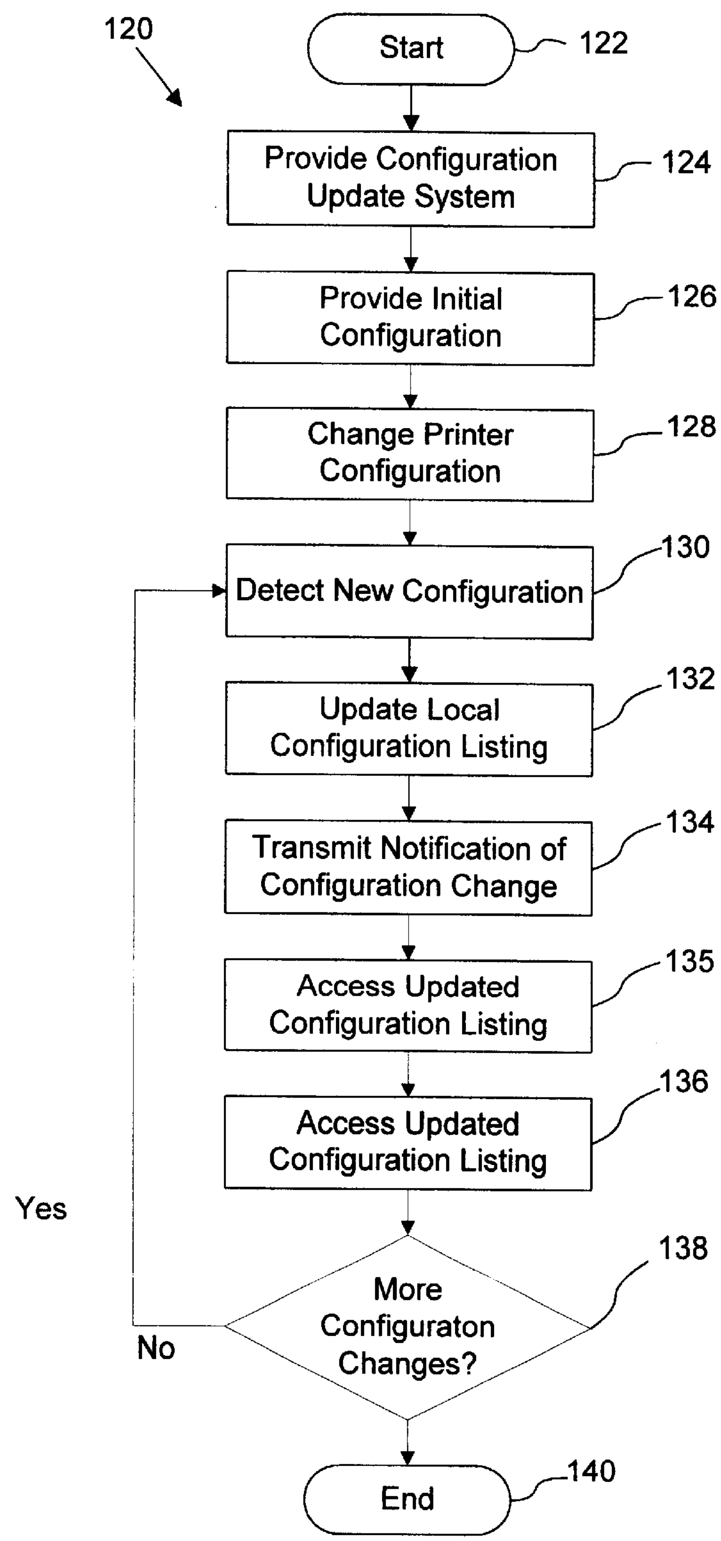
FIG. 5 is a schematic flow chart diagram illustrating a further embodiment of a printer update method of the present invention.

One embodiment of a method 120 of dynamically updating a printer configuration is shown in the schematic flow chart diagram of FIG. 5. The method 120 may be used in conjunction with the method 80 of FIG. 4. For instance, at the conclusion of the method 80, once the configuration of a printer recently brought on-line is initialized, control may be passed to the method 120 to monitor the dynamically configurable elements of the printer and to pass any changes in the printer configuration to the interface card 16.

The method 120 starts at a step 122. At a step 124, a configuration update system is provided. The configuration update system may be configured as described above with reference to the discussion of FIG. 2, and may be provided in the same manner as described for FIG. 4. At a step 126, an initial configuration is provided. Once again, this may be conducted in the manner described above for FIG. 4.

At a step 128, the printer configuration is changed. The change may comprise any dynamically variable change, and may comprise a modification to a printer tray, such as adding, removing, swapping, or altering the paper in a tray. Other dynamic changes may also be conducted, including changes to the printer control panel.

At a step 130, the new configuration is detected. This preferably comprises sensing the new configuration, and may involve the use of a sensor 25 and detection module 32 of FIG. 2. At a step 132, a local version of the configuration listing is updated. In one embodiment, this comprises updating the configuration listing 48 within the shared RAM 36 of FIG. 2.

Figure 7:
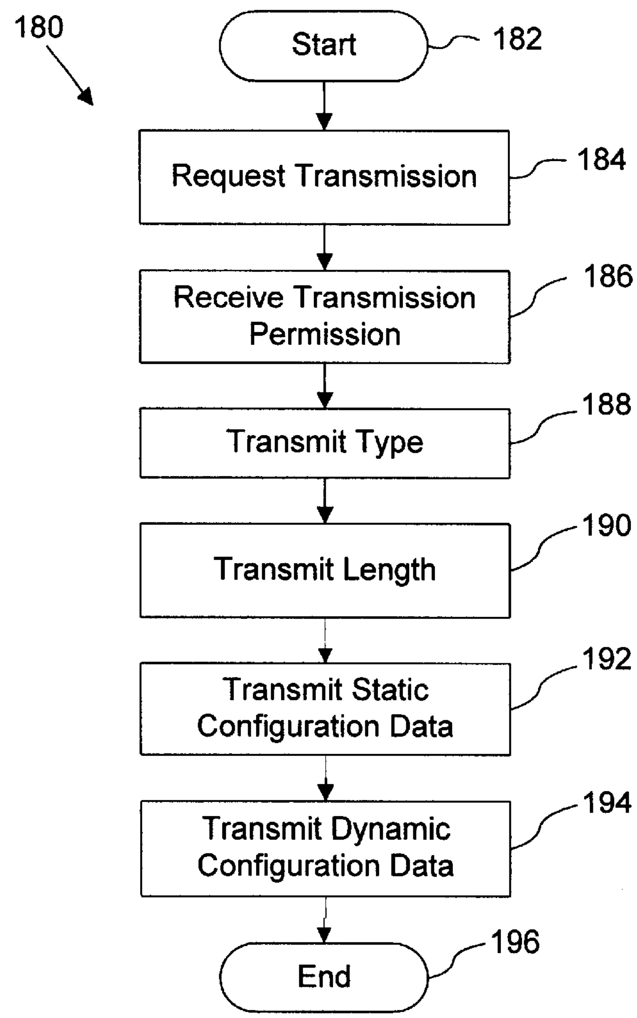
FIG. 7 is a schematic flow chart diagram illustrating one embodiment of a process for accomplishing a transmission step of the flow chart diagram of FIG. 5.

At a step 134, notice of the updated configuration listing is transmitted to the interface card 16. Notice may be passed through registers such as the registers 54 and 56 of FIG. 2 and may utilize interrupts. Thereafter, at a step 135, the interface card 16 accesses the updated configuration listing. This may involve direct memory access of the shared RAM 36. One process 180 for passing an updated configuration listing is illustrated in FIG. 7 and will be described in greater detail below.

At a step 136, the configuration listing is saved to interface card memory, preferably the nonvolatile memory 58 of FIG. 2. At a step 138, the method 120 waits for further configuration changes. When a configuration change occurs, the method proceeds to step 130. If no further configuration changes occur or if the system is taken off-line, the method 120 terminates at a step 140.

Referring now to FIG. 6, shown therein is one embodiment of a process 150 for updating or generating a configuration listing, as may be employed by the method 80 at a step 96, and a method 120 at a step 132. The process 150 begins at a step 152 and progresses to a step 154 where static-length configuration parameters may be listed. As discussed, fields within the configuration listing are of fixed numbers and lengths for these parameters.

At a step 156, the dynamic-length configuration parameters are listed. These are the parameters in the fields 72 of FIG. 3 that vary in length. Thus, for instance, if more printer trays or other dynamic-length parameters are present in a configuration listing, the configuration listing is longer, with fields for each of the printer trays. If less printer trays are present, the configuration listing, and particularly, the dynamic portion 72, is shorter.

At a step 158, the configuration parameters are placed in a set order. That is, the static-length and dynamic-length parameters are listed in an order expected by the configuration interpretation module 59 of FIG. 2. At a step 160, the state of the configuration parameters are listed within the configuration listing 48 according to predetermined options. For instance, parameters such as the size of paper within a paper tray may be listed with codes such as the PCL paper size codes as are commonly known in the art.

At a step 162, new configuration objects may be added to the configuration listing 48. For instance, when a new printer is brought on-line, its printer trays are added successively to the printer tray portion of the configuration listing. When a tray is removed, the corresponding portion of the configuration listing 48 may likewise be deleted at a step 164.

At a step 166, the length of the configuration listing is determined, and may be placed in a field 75 of the configuration listing of the data stream 64 of FIG. 3. At a step 168, the process 150 ends.

With the use of the present invention, new printers can be developed without the need to program much or any of the configuration of the new printers into the printer controller 30 and the interface card 16. Accordingly, much time and cost can be saved. In addition, configuration changes may be sensed during operation of the printer, allowing data streams transmitted to the printer 14 to be accurate and current and allowing for accurate protocol conversions of the data streams.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of automatically providing an updated printer configuration between a printer and a communicating device, the method comprising:

detecting internally within a printer a new printer configuration;

recording the new printer configuration; and notifying a communicating device that is configured to transact external communications for the printer of the new printer configuration.

2. The method of claim 1, wherein detecting internally within a printer a new printer configuration comprises detecting a new printer attached to the communicating device.

3. The method of claim 1, wherein detecting internally within a printer a new printer configuration comprises detecting a modification of a configuration of a printer already connected to the communicating device.

4. The method of claim 1, wherein the communicating device comprises an interface card for conducting network communications for the printer.

5. The method of claim 1, wherein the communicating device comprises a protocol converter for converting a first data stream into a second data stream with a protocol that is compatible with the printer.

6. The method of claim 5, further comprising converting a SCS data stream into a PCL data stream by the protocol converter.

7. The method of claim 1, wherein the new printer configuration comprises a modification of a printer tray.

8. The method of claim 1, wherein recording the change in configuration comprises updating a configuration listing.

9. The method of claim 8, wherein the configuration listing is a variable length, dynamic structure.

10. The method of claim 8, wherein the configuration listing comprises both static-length and dynamic-length counterparts.

11. The method of claim 1, further comprising providing a new model of printer with a new configuration and attaching the new model of printer to the communicating device and notifying the communicating device of the new model of printer without programming code individual to the new model of printer into the communicating device to communicate the new model of printer's configuration to the communicating device.

12. The method of claim 8, further comprising providing the configuration listing in a data stream of at least three components, a first component identifying the configuration listing, a second component specifying the length of the configuration listing, and a third component containing configuration data.

13. The method of claim 12, wherein the configuration data comprises fields listed in a predetermined order, each field containing a parameter of the printer configuration according to a selected protocol.

14. The method of claim 1, further comprising the communicating device accessing the configuration listing by a direct memory access to a shared memory resident on the printer.

15. A method of automatically providing an updated printer configuration between a printer and a communicating device, the method comprising:

establishing a protocol for communicating the printer configuration; between a printer and a communicating device that is configured to transact communications over a computer network for the printer;

providing a format for listing configuration options of the printer within a configuration listing;

providing printer software configured to generate the configuration listing;

providing communicating device software configured to receive and interpret the configuration listing;

providing a new printer configuration;

sensing internally within a printer the new printer configuration;

recording the new printer configuration;

notifying the communicating device of the new printer configuration;

transmitting the configuration listing to the communicating device;

receiving the new printer configuration at the communicating device; and updating the configuration listing at the communicating device.

16. The method of claim 15, wherein providing a new printer configuration comprises attaching a new printer to the communicating device.

17. The method of claim 15, wherein providing a new printer configuration comprises providing a modification of a configuration of a printer already connected to the communicating device.

18. The method of claim 16, wherein attaching a new printer to the communicating device comprises providing a new model of printer with a new configuration and attaching the new model of printer to the communicating device and wherein the communicating device is notified of the new model of printer without programming code individual to the new model of printer into the communicating device to communicate the new model of printer's configuration to the communicating device.

19. A printer configuration update system for automatically providing an updated printer configuration between a printer and a communicating device, the system comprising:

a configuration detector module configured to receive notification of a new printer configuration;

a configuration manager configured to update a configuration listing of the new printer configuration; and a communication module configured to communicate the new printer configuration to a communicating device that is configured to transact external communications for the printer.

20. The printer configuration update system of claim 19, further comprising a configuration interpretation module residing on the communicating device and configured to interpret the configuration listing.

21. The printer configuration update system of claim 19, further comprising a shared memory residing in a controller of the printer for use in passing the configuration listing with the communicating device.

22. The printer configuration update system of claim 19, further comprising a handshaking register resident on the communicating device, the handshaking register configured for use in effecting communication of the new configuration between the printer and the communicating device.

23. The printer configuration update system of claim 19, further comprising a communications channel between the printer and the communicating device, the communications channel operating under the PCI interface protocol.

24. The printer configuration system of claim 19, wherein the communicating device is a network interface card comprising a protocol converter and wherein the configuration listing comprises a dynamic configuration structure with a variable length.

* * * * *

UNITED STATES PATENT AND TRADEMARK OFFICE

CERTIFICATE OF CORRECTION

PATENT NO. : 6,693,722 B1
DATED : February 17, 2004
INVENTOR(S) : Mixer, Jr.

It is certified that error appears in the above-identified patent and that said Letters Patent is hereby corrected as shown below:

Drawings,
Figure 5, block 136, should read -- Save Configure Listing --.
Figure 6, block 162, "Objects to of" should read -- Objects to --.

Column 1,
Line 24, "a pressing" should read -- pressing --.

Column 3,
Line 21, "may in occur" should read -- may occur --.

Column 4,
Line 44, "printers 14" should read -- printers 14. --.
Line 67, "a interface" should read -- an interface --.

Column 5,
Line 39, "types communications" should read -- types of communications --.
Line 47, "comprise-length" should read -- comprise --.

Column 8,
Line 2, "step 104," should read -- step 102, --.
Line 41, "7 and will be described in greater detail below." should read -- 7. --.

Signed and Sealed this

Twenty-seventh Day of April, 2004

JON W. DUDAS
*Acting Director of the United States Patent and Trademark Office*